United States Patent
Bae et al.

(10) Patent No.: US 8,587,654 B2
(45) Date of Patent: Nov. 19, 2013

(54) NETWORK SWITCH CONTROL DIGITAL VIDEO RECORDER

(75) Inventors: Song-Nam Bae, Ansan-si (KR); Dong-Uk Park, Seoul (KR); Byung-Yun Lee, Suwon-si (KR)

(73) Assignee: ITX Security Co., Ltd., Seoul (KR)

( * ) Notice: Subject to any disclaimer, the term of this patent is extended or adjusted under 35 U.S.C. 154(b) by 257 days.

(21) Appl. No.: 13/117,212

(22) Filed: May 27, 2011

(65) Prior Publication Data
US 2011/0292207 A1    Dec. 1, 2011

(30) Foreign Application Priority Data

May 28, 2010 (KR) .................. 10-2010-0050603
May 20, 2011 (KR) .................. 10-2011-0047991

(51) Int. Cl.
*H04N 7/18* (2006.01)
*H04N 5/76* (2006.01)
*G06F 12/14* (2006.01)

(52) U.S. Cl.
USPC ............ 348/143; 386/292; 386/293; 713/188

(58) Field of Classification Search
USPC .................... 348/143; 386/292–293; 713/188
See application file for complete search history.

(56) References Cited

U.S. PATENT DOCUMENTS 8,010,992 B1 * 8/2011 Chang et al. ............... 726/1
2009/0276224 A1 * 11/2009 Medina et al. ............ 704/275
2011/0078744 A1 * 3/2011 Adimatyam et al. ...... 725/58

FOREIGN PATENT DOCUMENTS

KR   10-2009-0020319 A    2/2009

* cited by examiner

*Primary Examiner* — David Czekaj
*Assistant Examiner* — Tsion B Owens
(74) *Attorney, Agent, or Firm* — NSIP Law

(57) ABSTRACT

A network switch control digital video recorder (DVR) is provided. The network switch control DVR includes a network switch module configured to include a plurality of ports via which data is input to or output from at least one camera, a network storage, an external computer, and a DVR module and to multiplex data input or output via the plurality of ports; and the DVR module configured to control the input or output of data to or from the network switch module by monitoring a state of the input or output of data via the plurality of ports.

9 Claims, 4 Drawing Sheets

NETWORK SWITCH CONTROL DIGITAL VIDEO RECORDER

CROSS-REFERENCE TO RELATED APPLICATION(S)

This application claims the benefit under 35 U.S.C. §119 (a) of Korean Patent Application Nos. 10-2010-0050603 and 10-2011-0047991, filed on May 28, 2010 and May 20, 2011, respectively, in the Korean Intellectual Property Office, the entire disclosures of which are incorporated herein by reference for all purposes.

BACKGROUND

1. Field

The following description relates to a digital video recorder (DVR), and more particularly, to a network DVR or a hybrid DVR.

2. Description of the Related Art

Digital video recorders (DVRs) are devices to compress and store or display video is signals captured by a plurality of video cameras connected thereto in a wired manner, and have been widely used for security purposes for buildings, offices, automated teller machines (ATMs), and the like.

Conventionally, video signals captured by a video camera such as an analog CCTV camera are converted into analog signals by a video encoder, and the analog signals are transmitted to a DVR. The analog signals are converted into digital signals through analog-to-digital conversion (ADC) performed by a video decoder, and the digital signals are compressed and then played or transmitted. However, in reality, it is not easy to provide equipment for effectively transmitting video signals captured by thousands of video cameras to a control center via thousands of cable lines.

With recent developments in network and camera technologies, IP cameras that compress digital images and transmit the compressed digital images to a network and network DVRs that store compressed video streaming data provided by IP cameras have been widespread.

Devices that record and play image data provided by IP cameras are referred to as network DVRs, and devices that record, play and transmit not only image data provided by typical analog cameras but also image data provided by IP cameras are referred to as hybrid DVRs.

FIG. 1 illustrates an example of a system including a conventional DVR.

Referring to FIG. 1, a DVR 110, a plurality of IP cameras 120, a network storage 130 such as a network-attached storage (NAS), and a personal computer (PC) for external monitoring are connected to a communication network via a network switch 150.

The DVR 110 may be a network DVR or a hybrid DVR. However, in response to too many packets are being generated by the PC 140 due to a computer virus, the packets may all be broadcast to all the devices connected to the communication network, thereby causing various problems. For example, the packets may be transmitted to the DVR 110, the IP cameras 120, and the network storage 130 that are all connected to the network switch 150, and may cause a considerable amount of interrupts to be generated in the CPUs of the DVR 110, the IP cameras 120, and the network storage 130. As a result, the data processing speed of the DVR 110 may considerably decrease or the DVR 110 may fail to properly operate. That is, the stability of the operation of the DVR 110 may considerably decrease.

Network traffic that is irrelevant to network monitoring may make it difficult to properly transmit data via a network. In a case in which the PC 140 is configured to be able to access the IP cameras 120 and the network storage 130 at any time, the IP cameras 120 or the network storage 130 may be subject to an attack by hackers.

SUMMARY

The following description relates to a network switch control digital video recorder (DVR) to resolve the problem of instability resulting from the generation of an excessive amount of packets by a PC connected to a DVR due to a computer virus.

The following description also relates to a network switch control DVR to resolve the problem of instability in the provision of services resulting from the generation of network traffic irrelevant to network monitoring by devices connected to the same network as a DVR, network DVR or a hybrid DVR.

The following description also relates to a network switch control DVR to prevent IP cameras and a network storage (such as a network-attached storage) connected to a DVR from being hacked.

In one general aspect, there is provided a network switch control DVR to process image data received from at least one camera, the network switch control DVR including: a network switch module configured to include a plurality of ports via which data is input to or output from at least one camera, a network storage, an external computer, and a DVR module and to multiplex data input or output via the plurality of ports; and the DVR module configured to control the input or output of data to or from the network switch module by monitoring a state of the input or output of data via the plurality of ports.

In another general aspect, there is provided a network switch control DVR having a network switch that comprises a plurality of ports via which data is input to or output from at least one camera, a network storage, an external computer, and a DVR, and that multiplexes data input or output via the plurality of ports and the DVR that is connected to a communication network and that processes image data received from at least one camera, the network switch control DVR including: an additional network switch control interface configured to transmit data input/output control signals to or receive data input/output control signals from the network switch; and a controller configured to control the input or output of data to or from the network switch module by monitoring a state of the input or output of data via the plurality of ports with the aid of the network switch control interface.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various aspects are directed to a network switch control digital video recorder (DVR). The network switch control DVR may be implemented as an embedded type DVR having a network switch embedded therein or an exterior type DVR having a network switch attached to the exterior thereof. The embedded type DVR is further described with reference to FIG. 2.

Figure 1:
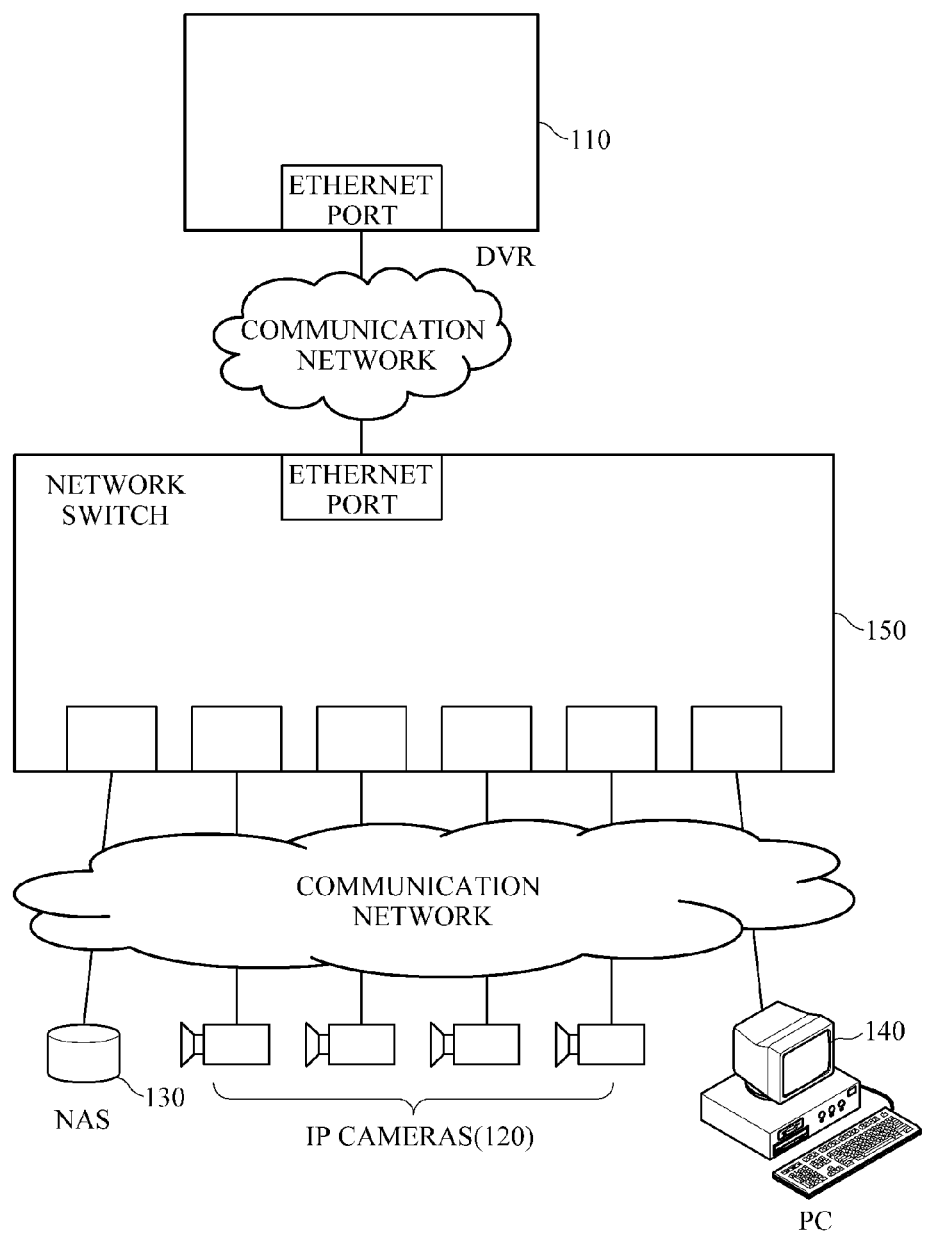
FIG. 1 is a diagram illustrating an example of a conventional digital video recorder (DVR) network.
Figure 2:
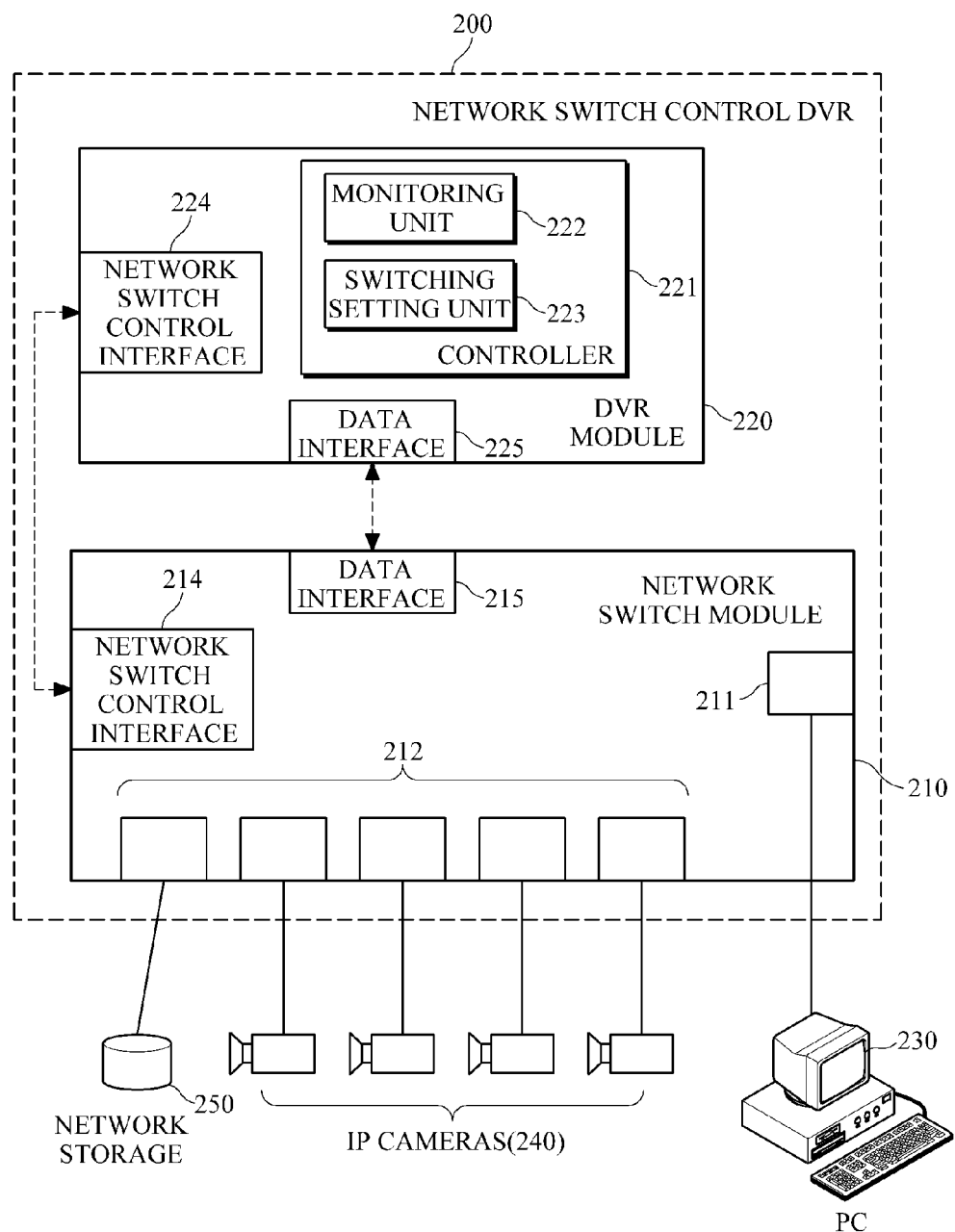
FIG. 2 is a diagram illustrating an example of a system including a network switch control DVR.

FIG. 2 illustrates an example of a system including a network switch control DVR.

Referring to FIG. 2, network switch control DVR 200 may include a network switch module 210 that is embedded in the network switch control DVR 200 as a chip. The network switch control DVR 200 may also include a DVR module 220 that controls the network switch module 210. Accordingly, it is possible to freely adjust the configuration of a network.

The network switch module 210 may allow a plurality of network devices to communicate data with each other. For example, the network switch module 210 may perform a multiplexing function for connecting an external PC 230, one or more IP cameras 240, and a network storage 250 to the DVR module 220. The network switch control DVR 200 may also include an Ethernet port 211 that can connect the external PC 230 to the network switch control DVR 200 and Ethernet ports 212 that can connect the IP cameras 240 and the network storage 250 to the network switch control DVR 200.

The network switch module 210 may be equipped with a media access control (MAC) address table including the addresses of the IP cameras 240 that are registered in a network. Accordingly, the network switch module 210 may reduce frame collisions and improve the speed of the transmission of frames by readily transmitting even network frames input thereto via arbitrary ports thereof.

A hub is generally classified into a dummy hub or a switching hub. Since, in response to the number of network devices used in a network and the amount of data transmitted in the network increasing, dummy hubs are highly likely to result in a rapid increase in the number of data collisions and to reduce the efficiency of the network, switching hubs is used more widely than dummy hubs.

Since switching hubs are equipped with various functions such as a bridge function, a function of configuring separate virtual local area networks (VLANs) for separate ports, a function of limiting the amount of packets received via a particular port, and the like, switching hubs may effectively control traffic between network devices.

VLAN is a technique to virtually group computers in a local area network (LAN) regardless of the pattern of the interconnections between the computers or the location of the installation of the computers, and has been standardized as IEEE 802.1Q. Various switching hubs equipped with a VLAN function have become available. By using the VLAN Function, it is possible to group network devices connected to the same switching hub into different groups and group network devices connected to different switching hubs into the same group.

The network switch module 210 may be a switching hub. The network switch module 210 may also include a network switch control interface 214 that is connected to a network switch control interface 224 of the DVR module 220.

The external PC 230 may be equipped with a camera image database function. For example, the external PC 230 select a camera channel that is connected to the network switch control DVR 200 under the control of an application program, may store images from a plurality of channels in a database as digital files at regular intervals of time, and may search through and execute the digital files stored in the database.

The IP cameras 240 may compress an input image signal into a bitstream with the aid of an image compressor, and may output the bitstream to the Ethernet ports 212. In response to IP version 6 (IPv6) being activated, the IP cameras 240 may be assigned their own IP addresses and may be controlled in an integrated manner.

The network storage 250 may be an exterior storage device, may include a plurality of hard disks, may be connected to the network switch control DVR 200, and may provide storage capacity for the network switch control DVR 200. The external storage 250 may be equipped with a plurality of communication ports including typical IN and OUT ports, and may include a plurality of communication modules respectively corresponding to the plurality of communication ports.

The DVR module 220 may store a bitstream input by at least one of the IP cameras 240 to a data interface 225 via the network switch 210 in a hard disk in an appropriate format. The DVR module 220 may decompress a bitstream obtained by compressing an image signal and may control a restored image obtained by decompressing the bitstream to be displayed on the screen of a monitor in real time. Detailed descriptions of the elements of the DVR module 220 are omitted for simplicity.

The DVR module 220 may control the network switch module 210. The DVR module 220 may include the network switch control interface 224 to transmit control signals to or receive control signals from the network switch module 210.

The DVR module 220 may block or limit the amount of data being received from the external PC 230 to the network switch control DVR 200 by determining in real time the amount and type of data being input to the Ethernet port 211 and the Ethernet ports 212 of the network switch module 210 with the aid of the network switch control interface 224. The DVR module 220 may stably process data being received from the IP cameras 240 by dividing the network between the Ethernet port 211 to which the external PC 230 is connected and the Ethernet ports 212 to which the IP cameras 240 and the network storage 250 are connected into one or more separate VLANs.

The DVR module 220 may also include a controller 221. The controller 221 may include a monitoring unit 222 to monitor network traffic at the Ethernet port 211 and the Ethernet ports 212 and a switching setting unit 223 to set one or more VLANs for the network switch module 210 and set a limit on network traffic.

The monitoring unit 222 may detect the amount of data being input to the network switch control DVR 200 via the Ethernet port 211 with the aid of the network switch control interface 224, or may analyze whether data input by the external PC 230 to the network switch control DVR 200 is valid data for the DVR module 220.

The switching setting unit 223 may perform a grouping function for setting one or more VLANs using a VLAN function of the network switch module 210.

Figure 3:
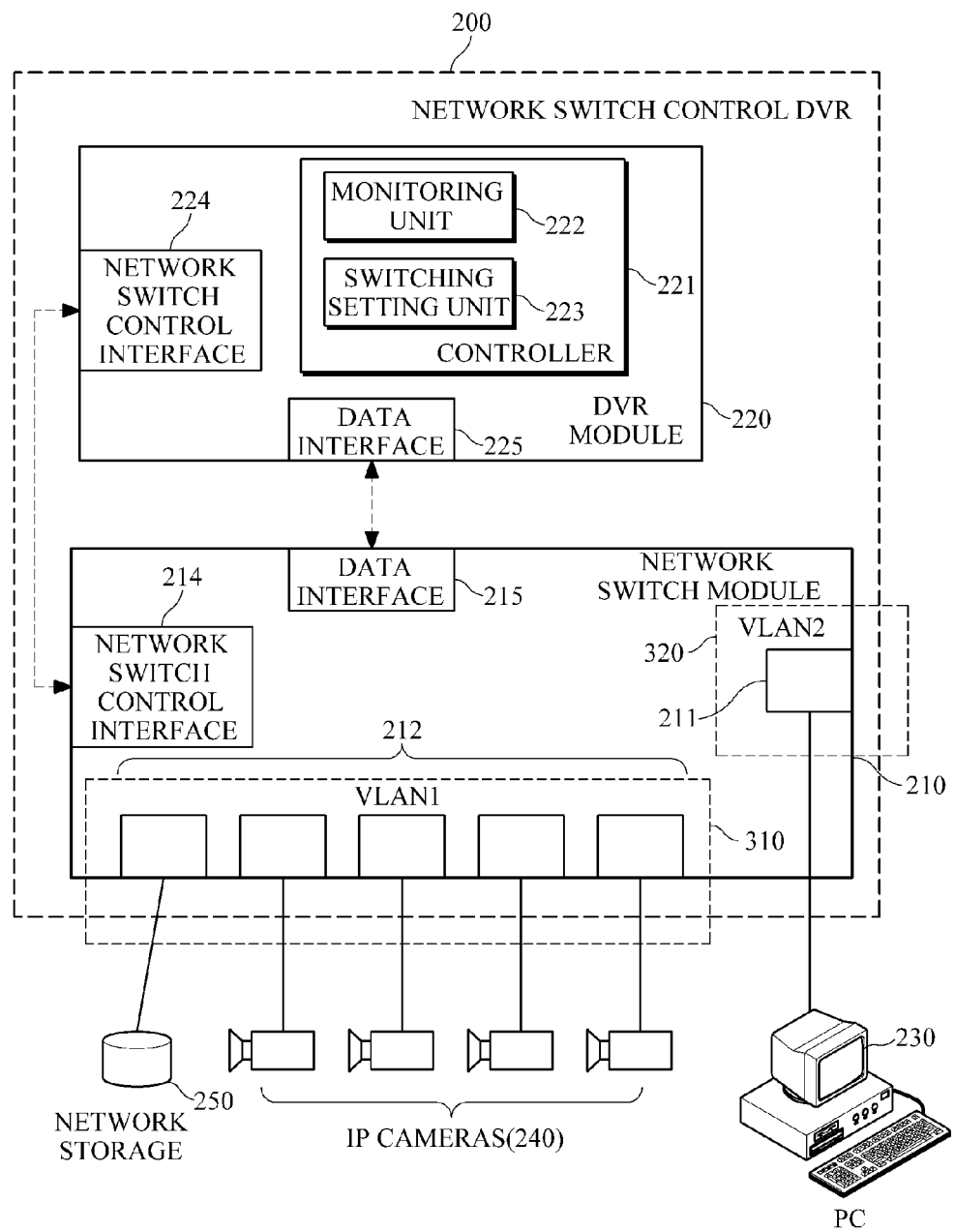
FIG. 3 is a diagram illustrating an example of setting a port to which an external PC is is connected as a separate network through a VLAN function of a network switch.

For example, referring to FIG. 3, the switching setting unit 223 may set the Ethernet port 212 to which the network storage 250 and the IP cameras 240 are connected as a first network 310 (i.e., VLAN1), and may set the Ethernet port 211 to which the external PC 230 is connected as a second network 320 (i.e., VLAN2). Since the external PC 230 is grouped into a different network from the IP cameras 240 and the network storage 250, the external PC 230 may not be able to directly access the IP cameras 240 or the network storage via a network.

Accordingly, it is possible to prevent malicious attempts to access the IP cameras 2240 or the network storage 250 through the external PC 230 and prevent the IP cameras 2240 and 250 from being overloaded with data packets received from the external PC 230.

The switching setting unit 223 may be configured to automatically perform a VLAN setting function for the Ethernet port 211 and the Ethernet ports 212 in response to being powered on, or may be configured to selectively perform the VLAN setting function based on the results of analysis performed by the monitoring unit 222.

For example, in a case in which the results of analysis performed by the monitoring unit 222 indicate that the amount of data being received from the external PC 230 exceeds a threshold level and is likely to affect the performance of the DVR module 220, the switching setting unit 223 may determine that an attack on the DVR module 220 is being launched by the external PC 230, and may inactivate the Ethernet port 211 to which the external PC 230 is connected or may limit the amount of data being received from the external PC 230. As another example, the switching setting unit 223 may set the external PC 230 as a separate virtual network from a virtual network including the IP cameras 240 or the network storage 250.

In a case in which the results of monitoring performed by the monitoring unit 222 indicate that there is a hacking attempt detected from the external PC 230, such as a flow of unnecessary data that is irrelevant to a DVR function, the switching setting unit 223 may inactivate the Ethernet port 211 to which the external PC 230 is connected or may set the external PC 230 as a separate virtual network from a virtual network including the IP cameras 240 or the network storage 250.

According to the example illustrated in FIG. 3, it is possible for IP cameras of a DVR to operate stably without being affected by an attack launched by an external PC.

A DVR equipped with an exterior network switch is further described with reference to FIG. 4.

Figure 4:
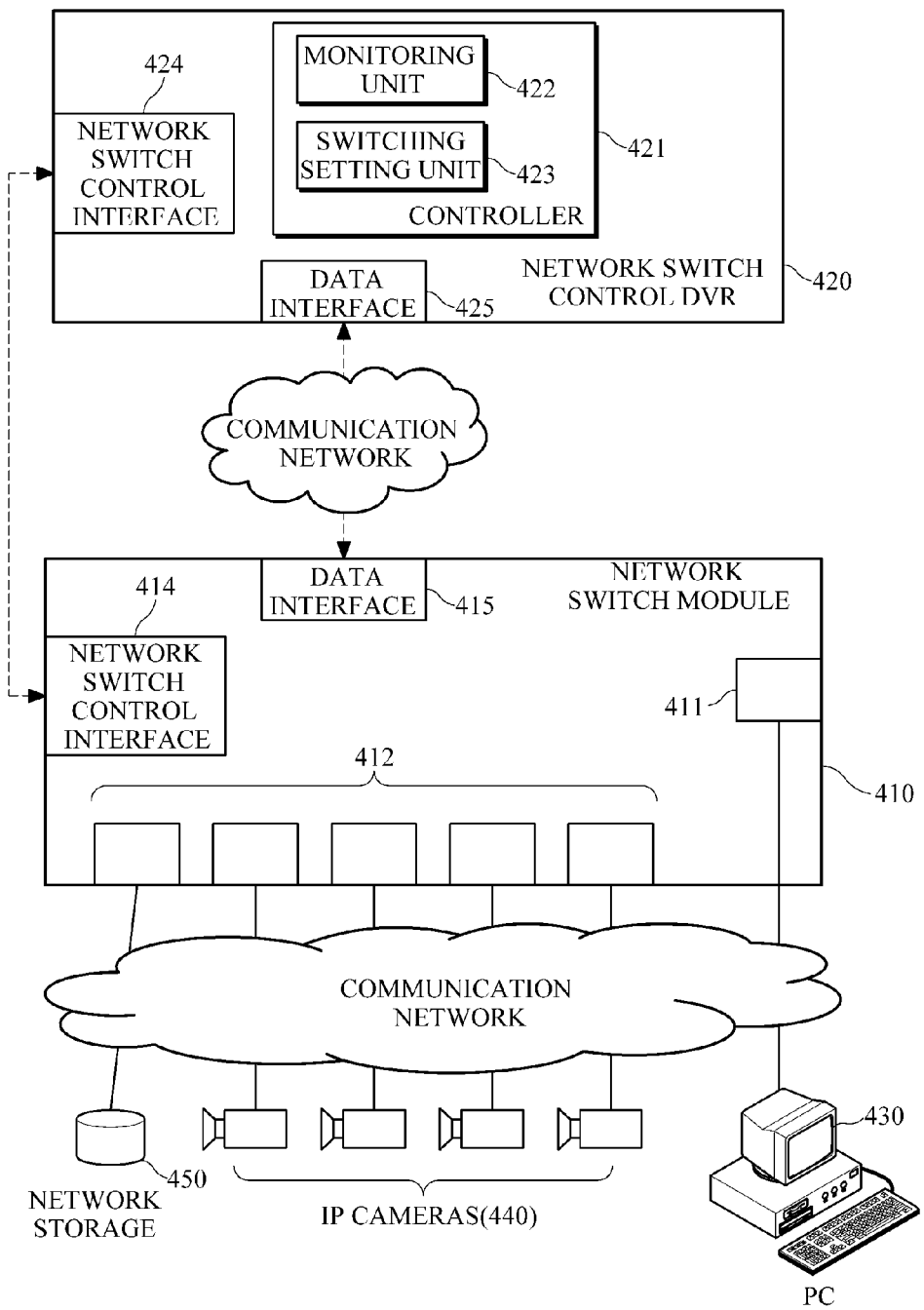
FIG. 4 is a diagram illustrating another example of a system including a network switch control DVR.

FIG. 4 illustrates another example of a system including a network switch control DVR.

Referring to FIG. 4, a network switch 410 may be implemented as an exterior element of a network switch control DVR. A DVR 420 may control the network switch 410 via a communication network, thereby freely adjusting the configuration of a network.

The network switch 410 is almost the same as the network switch module 210 illustrated in FIG. 2, and thus, a detailed description thereof is omitted.

For example, the network switch 410 may include a network switch control interface 414 that is connected to a network switch control interface 424 of the DVR 420. As another example, the network switch 410 may not include the network switch control interface 414, and may be connected to the DVR 420 via the Ethernet port 411 and the Ethernet ports 412 or via a data interface 415 according to a standard protocol or a predefined protocol. That is, a controller 421 may control the network switch 410 via the Ethernet port 411 and the Ethernet ports 412 of the network switch 410 or via the data interface 415.

To control the network switch 410, the DVR 420 may include the network switch control interface 424 for transmitting control signals to or receiving control signals from the network switch 410.

The DVR 420 may block or limit the amount of data being received from an external PC 430 by determining in real time the amount and type of data being input to the Ethernet port 411 and the Ethernet ports 412 of the network switch 410 with the aid of the network switch control interface 424. The DVR 420 may stably process data being received from a plurality of IP cameras 440 by dividing the network between the Ethernet port 411 to which the external PC 430 is connected and the Ethernet ports 412 to which the IP cameras 440 and a network storage 450 are connected into one or more separate VLANs.

The DVR 420 may also include the controller 421. The controller 421 may include a monitoring unit 422 to monitor network traffic at the Ethernet port 411 and the Ethernet ports 412 and a switching setting unit 423 to set one or more VLANs for the network switch 410 and set a limit on network traffic.

The operations of the monitoring unit 422 and the switching setting unit 423 are almost the same as the operations of the monitoring unit 222 and the switching setting unit 223 illustrated in FIG. 2, and thus, detailed descriptions thereof are omitted.

As described above, it is possible to improve the reliability of a network control switch DVR as security equipment by stabilizing the reception of data from IP cameras and preventing the IP cameras or a network storage such as a network-attached storage (NAS) from being hacked.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network switch control digital video recorder (DVR) to process image data received from at least one camera, the network switch control DVR comprising:
   a network switch module configured to include a plurality of ports via which data is input to or output from at least one camera, a network storage, an external computer, and a DVR module and to multiplex data input or output via the plurality of ports; and
   the DVR module configured to control the input or output of data to or from the network switch module by monitoring the generation of an excessive amount of packets by a PC connected to a DVR due to a computer virus according to a state of the input or output of data via the plurality of ports,
   wherein the network switch module comprises a first network switch control interface to transmit or receive data input/output control signals to or from the DVR module and the DVR module comprises a second network switch control interface to transmit or receive data input/output control signals to or from the network switch module.

2. The network switch control DVR of claim 1, wherein the DVR module further comprises:
- a monitoring unit configured to monitor the input and output of data to or from the network switch module via the second network switch control interface; and
- a switching setting unit configured to control one or more virtual networks for the network switch module based on monitoring results provided by the monitoring unit regarding the state of the input and output of data to or from the network switch module.

3. The network switch control DVR of claim 2, wherein the switching setting unit is further configured to, in response to the monitoring results indicating that an amount of data greater than a reference level or unnecessary data is being received from the external computer, block the reception of data from the external computer or limit the amount of data being received from the external computer below the reference level.

4. The network switch control DVR of claim 2, wherein the switching setting unit is further configured to, in response to the monitoring results indicating that an amount of data greater than a reference level or unnecessary data is being received from the external computer, set the external computer as a separate virtual network from a virtual network including the at least one camera and the network storage.

5. A network switch control DVR having a network switch module that comprises a plurality of ports via which data is input to or output from at least one camera, a network storage, an external computer, and a DVR, and that multiplexes data input or output via the plurality of ports and the DVR that is connected to a communication network and that processes image data received from at least one camera, the network switch control DVR comprising:
- a network switch control interface configured to transmit data input/output control signals to or receive data input/output control signals from the network switch module; and
- a controller configured to control the input or output of data to or from the network switch module by monitoring the generation of an excessive amount of packets by a PC connected to a DVR due to a computer virus according to a state of the input or output of data via the plurality of ports with the aid of the network switch control interface, wherein the network switch module comprises a first network switch control interface to transmit or receive data input/output control signals to or from the DVR module and the DVR module comprises a second network switch control interface to transmit or receive data input/output control signals to or from the network switch module.

6. The network switch control DVR of claim 5, wherein the controller comprises:
- a monitoring unit configured to monitor the input and output of data to or from the network switch module via the network switch control interface; and
- a switching setting unit configured to control one or more virtual networks for the network switch module based on monitoring results provided by the monitoring unit regarding the state of the input and output of data to or from the network switch module.

7. The network switch control DVR of claim 6, wherein the switching setting unit is further configured to, in response to the monitoring results indicating that an amount of data greater than a reference level or unnecessary data is being received from the external computer, block the reception of data from the external computer or limit the amount of data being received from the external computer below the reference level.

8. The network switch control DVR of claim 6, wherein the switching setting unit is further configured to, in response to the monitoring results indicating that an amount of data greater than a reference level or unnecessary data is being received from the external computer, set the external computer as a separate virtual network from a virtual network including the at least one camera and the network storage.

9. The network switch control DVR of claim 5, wherein the controller is further configured to transmit or receive the data input/output control signals via a data input/output (I/O) port that is included in the network switch.

* * * * *